United States Patent [19]

De Muynck

[11] 4,354,798
[45] Oct. 19, 1982

[54] ROTARY TOOL POSITIONING UNIT FOR A WOODWORKING MACHINE

[75] Inventor: Gabriel De Muynck, Ardooie, Belgium

[73] Assignee: Bekaert Engineering, Zwevegem, Belgium

[21] Appl. No.: 142,677

[22] Filed: Apr. 22, 1980

[30] Foreign Application Priority Data

Apr. 23, 1979 [BE] Belgium ................ 1/9365

[51] Int. Cl.³ ............................ B27C 9/02; B23Q 1/18
[52] U.S. Cl. .............................. 414/750; 144/136 R; 144/2 R; 409/191; 409/196
[58] Field of Search ............................ 414/749–751; 409/190, 191, 196, 184; 144/134 R, 134 A, 136 R, 3 R, 2 R; 408/10, 11

[56] References Cited

U.S. PATENT DOCUMENTS

| | | | |
|---|---|---|---|
| 1,628,845 | 5/1927 | Jackson | 144/24 |
| 1,852,387 | 4/1932 | Wieden | 144/3 R X |
| 2,071,005 | 2/1937 | Swickard | 144/3 R |
| 2,811,182 | 10/1957 | Beale | 143/6 |
| 3,703,834 | 11/1972 | Beezer | 414/749 X |
| 4,022,106 | 5/1977 | Kile | 409/191 X |
| 4,098,088 | 7/1978 | Mason | 414/749 X |
| 4,187,601 | 2/1980 | Aldrin | 409/191 X |

FOREIGN PATENT DOCUMENTS 685668 6/1930 France.
359875 3/1962 Switzerland.
742446 12/1955 United Kingdom.

*Primary Examiner*—John J. Love
*Assistant Examiner*—Terrance L. Siemens
*Attorney, Agent, or Firm*—Shlesinger, Arkwright, Garvey & Dinsmore

[57] ABSTRACT

A rotary tool positioning unit for machining workpieces is disclosed having a rotary tool holder and a plurality of slide bearings cooperating with one another in such a manner that the rotary tool holder is capable of independent translational movement in either of two directions perpendicular with respect to one another and capable of independent rotation about either of two axes perpendicular with respect to one another. One of the translational directions is parallel to one of the rotational axes. The unit also includes an eccentric cam shaft cooperating with two slide bearings perpendicular with respect to one another for imparting a reciprocating movement to the tool holder in a direction perpendicular to the longitudinal axis of the tool holder.

6 Claims, 6 Drawing Figures

ROTARY TOOL POSITIONING UNIT FOR A WOODWORKING MACHINE

The invention relates to a rotary tool positioning unit for machining wooden workpieces on an universal machine. The unit is fixedly connected on a machine frame as described in Belgian Pat. No. 875,769 and can position a tool holder as described in Belgian Pat. No. 875,771.

The cutting tools provided on such units are suited for cutting, drilling, sawing, boring and other shaping operations. Preferably the positioning unit is adapted to allow machining operations for making connecting elements like dowels and dowel holes on wooden workpieces for furniture articles.

As a result of the design of the positioning unit, its dimension in one transverse direction is limited and several cutting units can be mounted next to and opposite to each other.

Some existing machines wherein the tools stay fixedly mounted can partially perform one or more operations whereas on other machines the position of the tools can be changed but only after a time-consuming resetting.

The use of a positioning unit according to the invention as a standard component makes it much easier to programme the cutting sequences, whereby they are sufficiently flexible to be set for any specific shaping job, more particularly for finishing connecting pieces such as longitudinal and circular dowel holes. This setting is possible without the use of an existing model or template.

The invention relates to a rotary tool positioning unit for machining wooden workpieces on a universal machine, wherein the unit can be clamped on an alignment surface of the machine frame and wherein the unit comprises driving means for different components of the unit, means to carry out independent rotations and translations, and a revolving tool holder, whereby the tool holder is able to make a rotation about at least two different axes perpendicular to each other and a translation in at least two different directions perpendicular to each other, one of the translation directions being parallel to one of said rotation axes, whereby a reciprocating movement is imparted to the toolholder in a direction perpendicular to the rotational axis of the tool holder.

The invention also relates to a positioning unit in which the reciprocating movement is transmitted from an eccentric camshaft by two slide bearings perpendicular to each other.

The invention also relates to a positioning unit in which said two slide bearings contain two parallel cylindrical sliding guides. According to a preferred embodiment of the invention the translational approach of the toolholder to the workpiece is by means of a third slide bearing of two parallel cylindrical guides sliding perpendicularly to the former two perpendicular slide bearings transmitting the eccentric camshaft drive to the toolholder.

The toolholder together with its driving motor and ultimate transmission gear approaches the workpiece in a translation controlled by a double compartment pressure cylinder powered by pneumatic or hydraulic means.

The construction and design of a positioning unit will be explained in the following description with reference to the accompanying drawings.

FIG. 1 shows the set-up of a number of basic parts which provide the desired operation and positioning of the tool.

Figure 1:
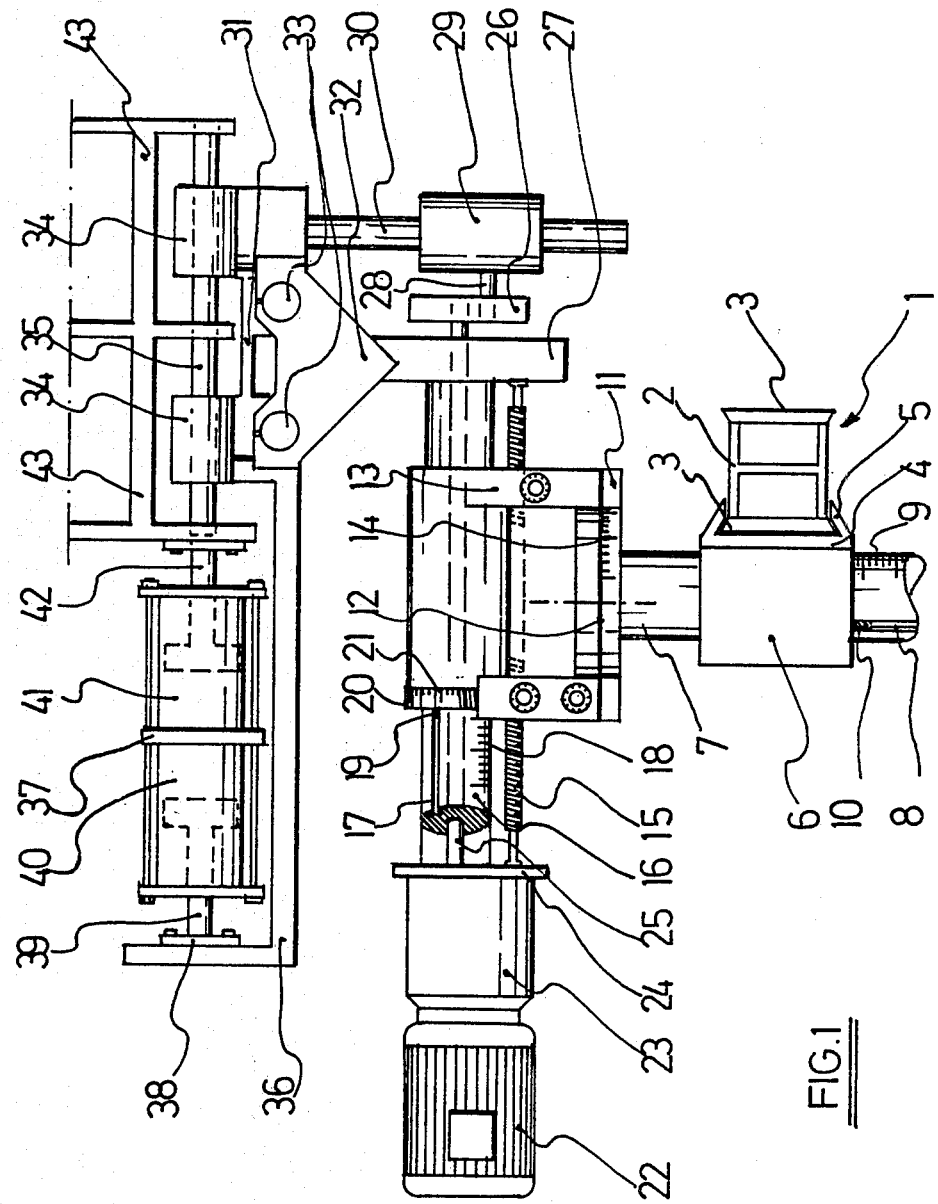
FIG. 1 is a partial side view of a positioning unit.

The beam 1 shown in cross-section is composed of a supporting portion 2 provided with alignment surfaces 3 with dovetail cross-sectional profiles which position the positioning unit.

The supporting plate 4 is clamped to the alignment surface 3 by means of projections 5 so that, if desired, it can be detached and moved. A slide bearing 6 supports and guides the tube 7 provided with key slot 8 and index 9, which is slid into the bearing 6 and fixed in a given position. The key 10 in slot 8 and in the corresponding slot inside the slide bearing 6 prevents tube 7 from rotating.

A flanged plate 11 is fixed perpendicular to the axis of tube 7 to make the connection with the next part of the positioning unit. The upper surface 12 of the flanged plate 11 forms a connection with a second slide bearing housing 13. A gear 51 (shown in FIG. 3) is fixedly connected with the flanged plate 11 and is incorporated in the bottom surface of the slide bearing housing 13. A hole contains a connecting arrangement between the slide bearing housing 13 and the flanged plate 11 so that this housing is able to rotate on the upper surface 12 around the tube 7. The setting can be read from scale 14.

The connecting structure and possibilities for various settings of the structure are now further explained with reference to FIGS. 3 and 4. The slide bearing housing 13 guides a second tube 16 and cooperates with a threaded push rod 15 for adjusting the relative positions of the housing 13 and the tube 16 which also possesses a key slot 17 and scale 18. A corresponding key 19 and an embracing ring 20 with scale 21 permit the adjustment of the rotation of the tube 16 in the slide bearing.

A motor 22 with reduction box 23 is supported by a flanged plate 24 on the tube 16 and drives the central shaft 25 which extends completely through the tube 16 and commands the rotation of the eccentric block 26 at the front side of the front plate 27. The eccentric block 26 is further illustrated in FIG. 5. It has the function of an eccentric camshaft drive.

An eccentric pin 28 is supported in the central part of a double slide bearing 29 which slides over two parallel cylinders 30 giving a lateral reciprocating movement to these cylinders 30, to a table 31 which they support, and to everything attached fixedly to the table 31.

Two cylindrical members 33 are clamped between triangular table supports 32 at both sides of the front plate 27. They support the table 31 which is slidably mounted thereon thus forming another slide bearing which permits the lateral movement. A double support 34 constituting a slide bearing for a third pair of cylinders 35 is fixedly attached to the table 31 together with member 36, which serves as a support for the double pressure cylinder 37 which commands the rapid and slow movement of the tool holder shown in FIG. 2. A fast movement is controlled by pressurized air in the first compartment 40 of the cylinder 37 with the help of a flanged plate 38 and a first push rod 39.

Figure 2:
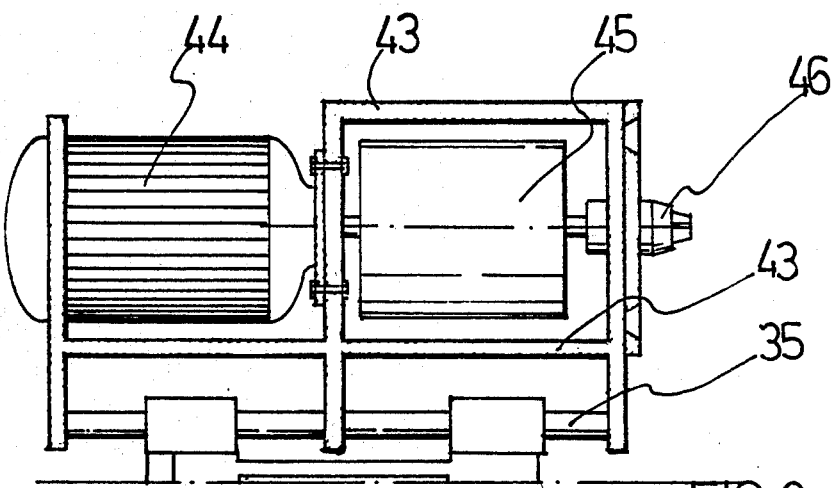
FIG. 2 is an additional side view complementary to FIG. 1.

In a second compartment 41, an uncompressible fluid, such as oil, provides the fine adjustment of the movement of the push rod 42 which is fixedly connected to the supporting crosshead 43 of the milling head shown in FIG. 2. The supporting crosshead 43 includes two cylinders 35 which are guided in the double support 34 constituting the slide bearing on table 31. This specific set-up diminishes the risk of jolting.

FIG. 2 shows the arrangement including the tool holder. The supporting crosshead 43 supports the electric motor 44 which via a speed reducing transmission 45 drives the tool holder 46.

The entire tool positioning unit comprises four different parts:

A clamping member which preferably allows a translation relative to the machine frame and provides a connection with the next part of the positioning unit.

An eccentric drive member which permits a rotation and a translation perpendicular to the preceding translation and provides the connection with the next part of the positioning unit.

A part having reciprocal movement which also comprises the approach control towards the workpiece. The approach control produces a translation parallel with the second translation movement.

A fourth part comprises one or more tool holders and their driving means.

It is evident that for the electric and pneumatic or hydraulic drive, the necessary conduits, connection boxes and valves, means for transmitting the control signals, and positioning scales and indexes may be necessary, for example also to automate the adjustment operations which are normally carried out manually. For the sake of simplicity these components are not shown in the drawings.

Figure 3:
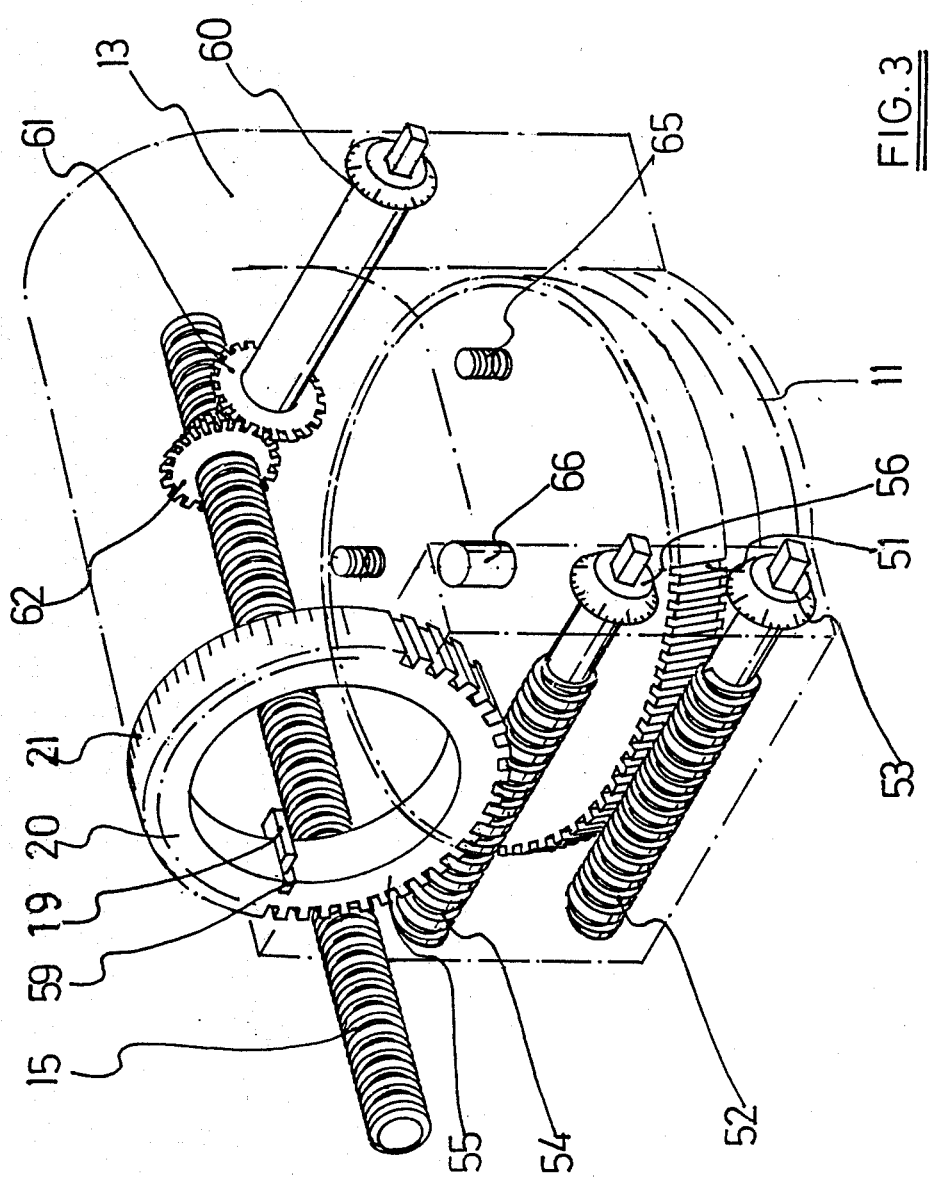
FIG. 3 is a perspective view of a part of the operating elements for positioning the milling unit.

FIG. 3 is a perspective view of the rotation connection between the first and second parts of the positioning unit. The flanged plate 11 supports a gear wheel with helical teeth 51 which fits in the hole of the slide bearing housing 13 (see also FIG. 4 for a detailed cross-section).

By means of a worm 52 operated by an adjusting knob 53, an accurate rotation of the milling head can be achieved. A further rotation perpendicular to the preceding one is obtained by means of a second worm 54 and appropriate gearing operated by means of adjusting knob 56. The worm engages a ring 20 which is preferably partly incorporated in the slide bearing housing 13 partially coinciding with the outer surface so that a scale 21 can be provided. The innerside of the ring 20 is adapted to the diameter of the tube 16 so that, by means of a key 19 in the corresponding key slots 59 and 17, this ring 20 can slide on tube 16 thus permitting a translation of the eccentric drive arrangement.

This additional translation is achieved by means of a third incorporated transmission wherein the adjusting knob 60 drives a conical gear 61, which itself drives, at right angles to the gear 61, a second conical gear 62 concentric with the threaded push rod 15. The gear 62 is suitably threaded at the inside so that when rotating it achieves a movement of the push rod 15 and the tube 16 relative to the entire slide bearing housing 13.

Figure 4:
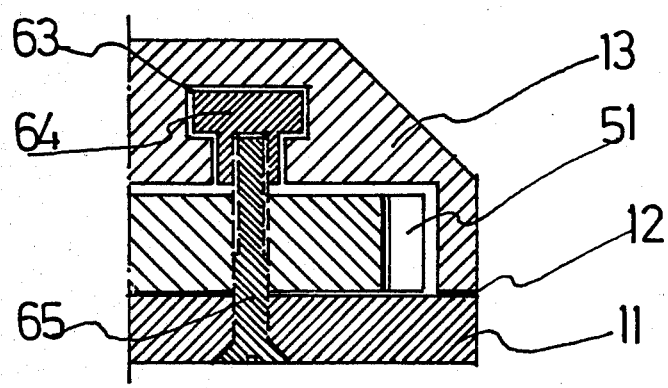
FIG. 4 is a fragmentary sectional view of a rotating connection.

FIG. 4 shows a cross-section of the preferred connection between the flanged plate 11 and the slide bearing housing 13. The slide bearing housing 13 is provided at the bottom with a sealing ring on the surface 12 and against the set of teeth 51. Also a concentric T-shaped slot 63 is provided in which curved T-shaped blocks 64 fit which support the rotating slide bearing housing at its underside. Both components can be clamped to each other by means of connecting screws 65. By means of a pin 66 and corresponding pin hole, as shown in FIG. 3, a stable concentric set-up can be achieved.

Figure 5:
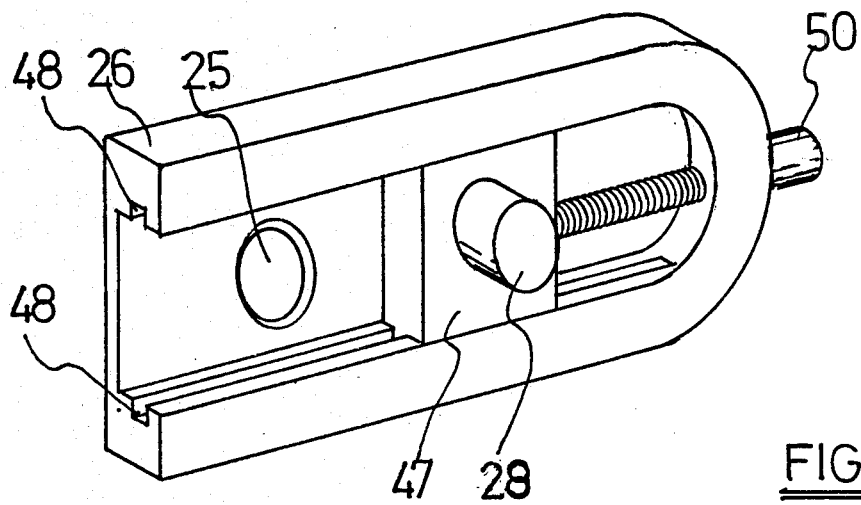
FIG. 5 is a perspective view of the adjustable eccentric drive.

FIG. 5 is a perspective detailed view of the eccentric drive for the reciprocating movement of the tool holder. The eccentric block 26 is fixedly connected to the rotating pin 25 of tube 16. A hole is recessed in the center of the block 26, in which the slide 47 is mounted in engagement with the slots 48 in which it may be slid to provide for accurate adjustment of the slide 47. The shaft distance of the pin 28 fixed on the slide 47 relative to the axis of the rotating pin 25 is equal to the oscillation amplitude of the tool holder. This amplitude is set by a fine adjustment by means of screw 50. If the amplitude is equal to zero, then the eccentric drive is obviously switched off. Preferably the pin 28 is provided with a self-adjusting needle bearing centrally located between the double slide bearing 29 to prevent vibrations resulting from alignment errors.

Figure 6:
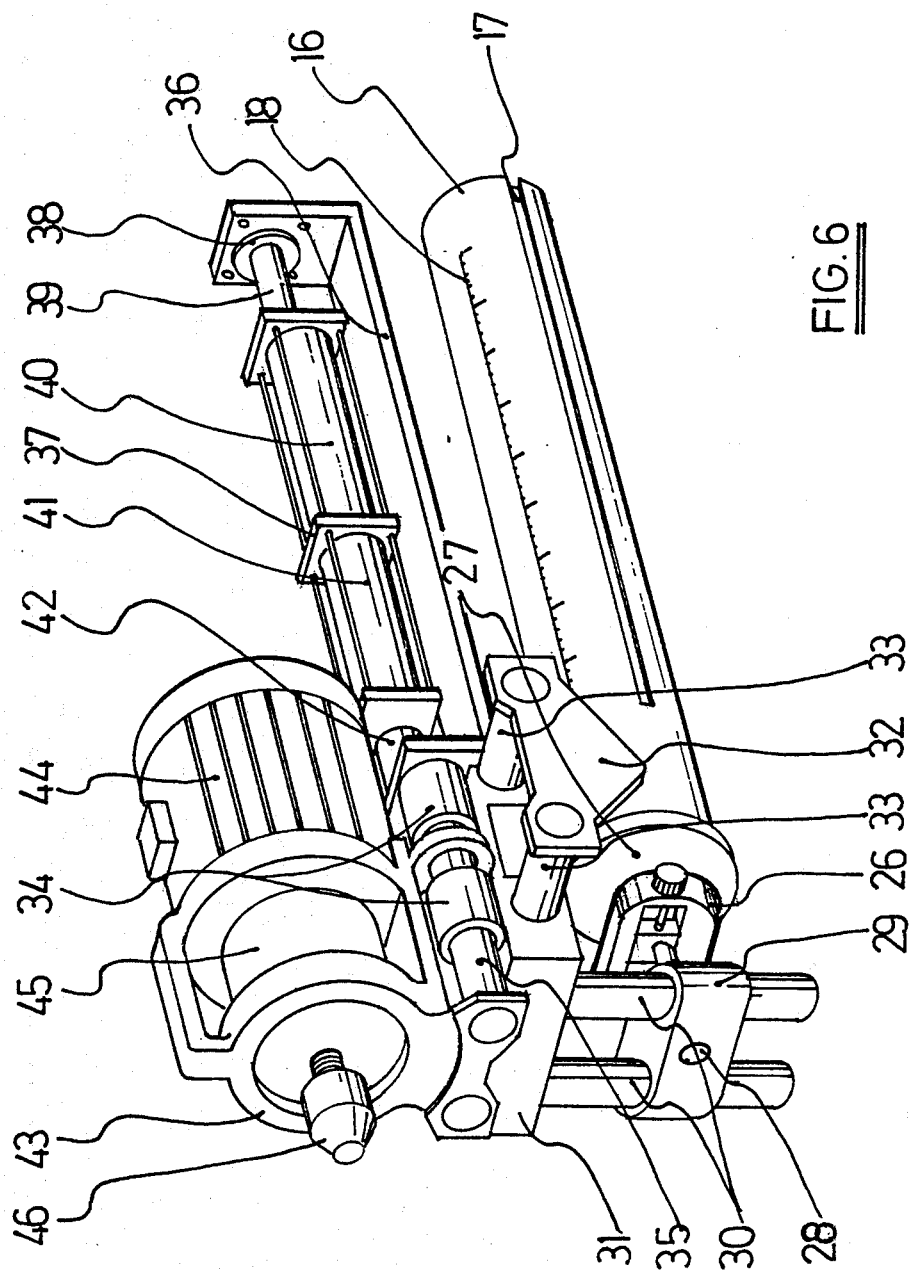
FIG. 6 is a perspective view of the tool holder.

FIG. 6 is a perspective view of the tool holder with drive, approach mechanism and the mechanism for the eccentric movement. The reference numbers in the different figures correspond. The direct connection between the motor 44, the transmission 45 and the tool holder 46 decreases the risk of vibration marks on the workpiece.

What is claimed is:

1. A rotary tool positioning unit adapted to be fixedly connected on an alignment surface of a machine frame for machining workpieces, said unit comprising:
    a rotary tool holder having a longitudinal axis about which a tool held by said tool holder is adapted to be rotated;
    means for independent translation of said tool holder in a first direction;
    means for independent translation of said tool holder in a second direction perpendicular to said first direction;
    means for independent rotation of said tool holder about a first axis;
    means for independent rotation of said tool holder about a second axis perpendicular to said first axis;
    one of said translation directions being parallel to one of said first and second axes of tool holder rotation; and,
    means for imparting a reciprocating movement to said tool holder in a direction perpendicular to said longitudinal axis of said tool holder, said means for imparting a reciprocating movement comprising first and second slide bearing means cooperating with said tool holder and oriented for sliding perpendicularly with respect to one another and an eccentric cam shaft drive means cooperating with said first and second slide bearing means whereby the rotational movement of said drive means is transmitted through said first and second slide bearing means in the form of a reciprocating movement imparted to said tool holder.

2. A rotary tool positioning unit according to claim 1 wherein each of said first and second slide bearing means includes two parallel guide cylinders.

3. A rotary tool positioning unit according to claim 1 and including a third slide bearing means connected to said tool holder for translation of said tool holder along its longitudinal axis toward a workpiece, said third slide bearing means being oriented for sliding perpendicularly with respect to said first and second slide bearing means.

4. A rotary tool positioning unit according to claim 3 wherein said third slide bearing means includes two parallel guide cylinders.

5. A rotary tool positioning unit according to claim 3 and including:
 a motor for driving said tool holder and a speed reducing transmission interconnecting said motor and said tool holder, said motor and said speed reducing transmission adapted to be moved together with said tool holder in cooperation with said third slide bearing means in translation along the longitudinal axis of said tool holder; and,
 a double compartment pressure cylinder for controlling the translation of said tool holder, said motor and said speed reducing transmission with respect to the longitudinal axis of said tool holder.

6. A rotary tool positioning unit adapted to be fixedly connected on an alignment surface of a machine frame for machining workpieces, said unit comprising:
 a table;
 means for independent translation of said table in a first direction;
 means for independent translation of said table in a second direction perpendicular to said first direction;
 means for independent rotation of said table about a first axis;
 means for independent rotation of said table about a second axis perpendicular to said first axis;
 one of said translation directions being parallel to one of said rotation axes;
 a rotary tool holder on said table, said tool holder having a longitudinal axis about which a tool held by said tool holder is adapted to be rotated;
 means on said table for driving said tool holder;
 first slide bearing means cooperating with said tool holder for translation of said tool holder along its longitudinal axis towards a workpiece;
 a double compartment pressure cylinder on said table for controlling the translation of said tool holder along its longitudinal axis;
 second and third slide bearing means cooperating with said table, said second slide bearing means including track means and means for said table to slide on said track means, said third slide bearing means including a slide and track means for said slide, said track means of said second and third slide bearing means being oriented perpendicularly with respect to one another and the longitudinal axis of said tool holder whereby said second and third slide bearing means are adapted for sliding movement perpendicularly with respect to one another and with respect to the longitudinal axis of said tool holder; and,
 an eccentric cam shaft drive means connected to said slide of said third slide bearing means and oriented for rotation about an axis parallel with the longitudinal axis of said tool holder;
 said track means of said second slide bearing means being fixedly connected to said eccentric cam shaft drive means and said track means of said third slide bearing means being fixedly connected to said table whereby the rotational movement of said eccentric drive means is transmitted through said second and third slide bearing means in the form of a lateral reciprocating movement imparted to said tool holder.

* * * * *